Figure 1:
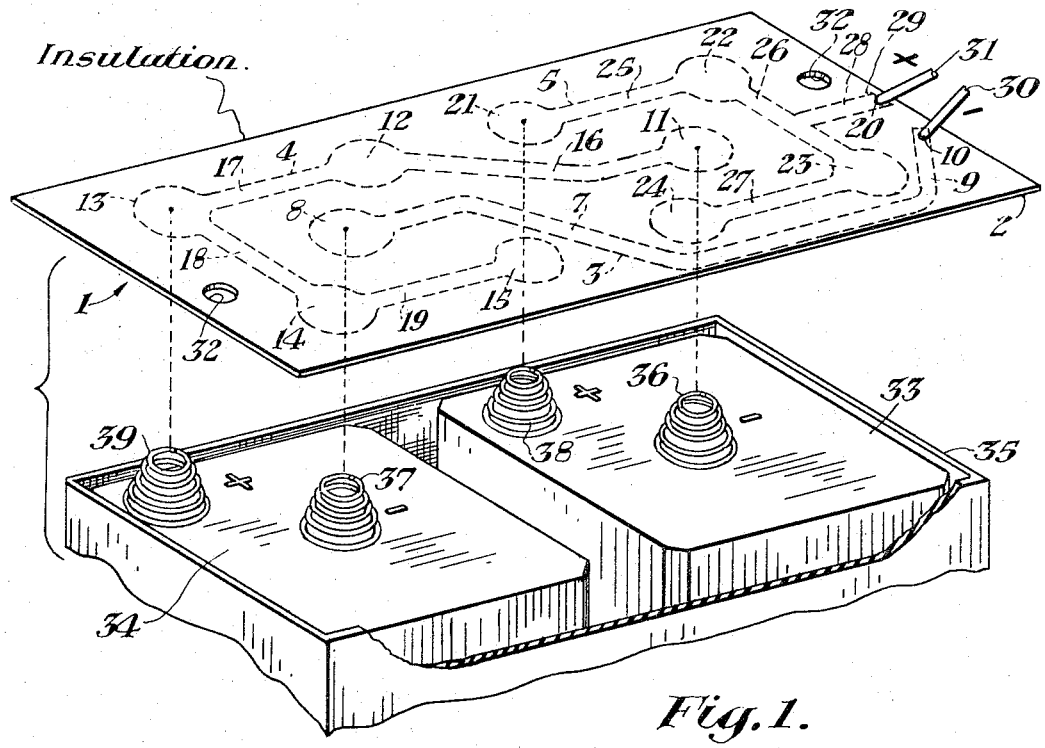

Aug. 29, 1967   A. F. FREELAND   3,339,169
FOOLPROOF BATTERY CONNECTOR
Filed Dec. 3, 1964

INVENTOR.
Andrew F. Freeland.
BY
W. L. Stout
HIS ATTORNEY

United States Patent Office 3,339,169
Patented Aug. 29, 1967

3,339,169
FOOLPROOF BATTERY CONNECTOR
Andrew F. Freeland, Monroeville, Pa., assignor to Westinghouse Air Brake Company, Swissvale, Pa., a corporation of Pennsylvania
Filed Dec. 3, 1964, Ser. No. 415,597
2 Claims. (Cl. 339—17)

My invention relates generally to an electrical power supply circuit connector and more particularly to an electrical primary battery circuit connector which insures proper polarization and voltage being applied to a pair of output conductors regardless of battery orientation.

In many instances, for example, in portable communication equipment utilizing semiconductive elements, the need has arisen for insuring that the voltage of a battery power supply always be correctly applied thereto since transistors are readily damaged and destroyed by incorrectly connected potentials. In recent years, the field of railroading has provided an attractive and lucrative market for transistorized communication apparatus since miniaturized equipment of this type not only possesses many of the attributes of the more conventional tube-type communication equipment but also has the advantages of being lighter and more compact, and therefore more readily applicable for field communication. However, in producing radio equipment for railroads, it has been found that most of the purchased railroad lantern batteries have a voltage rating of six (6) volts, and therefore it is necessary that a pair of batteries be serially connected to provide the required twelve (12) volts demanded by the transistorized radio apparatus. Accordingly, since each of the lantern batteries may be disposed in any of four possible positions and a pair of lantern batteries may be serially interconnected in any of four possible circuit configurations, it is quite simple to interconnect the batteries to produce a potential condition which could cause inoperativeness of the communication equipment or even worse result in the destruction of various stages of the communication equipment.

Accordingly, it is an object of my invention to provide a unique foolproof electrical battery circuit connector which avoids the above-mentioned disadvantages.

Another object of my invention is to provide a unique battery circuit connector which always results in an output voltage of one given polarity independent of battery orientation.

A further object of my invention is to provide a novel polarized battery circuit connector which is simple, strong, inexpensive, easy to manufacture, and convenient to use.

Still a further object of my invention is to provide a dual-battery circuit connector for serially interconnecting a pair of batteries in additive relationship for achieving polarized output connection.

A still further object of my invention is to provide a unique printed circuit board connector for serially additively connecting a plurality of batteries resulting in a given output polarity irrespective of battery orientation.

Other features, objects, and advantages of my invention will appear as the description of the specification progresses.

In accordance with my invention, the new and unique electrical battery circuit connector employs a printed circuit board which is arranged to serially interconnect a plurality of lantern batteries so that only one given output polarity is ever possible regardless of the orientation of the batteries. The printed circuit board or panel includes a rectangularly-shaped insulating body having a conductive pattern etched on one side thereof. The conductive pattern consists of circularly shaped battery terminal engaging portions and ribbon-like series circuit interconnecting portions. A pair of output conductors are soldered to terminal area portions of the circuit interconnecting portions for providing suitable output connections for an electrical load.

Figure 2:
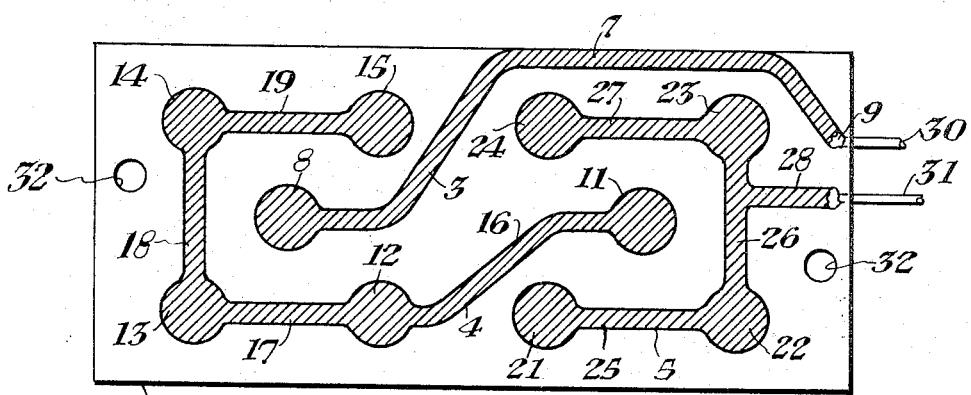

For a more complete understanding of my invention and other objects and advantages originating therefrom, reference should now be made to the following detailed description and to the accompanying drawings, in which:

FIG. 1 is an exploded view of the electrical connector arrangement embodying the invention with the printed circuit board removed from the lantern batteries; and FIG. 2 is a bottom plan view of the printed circuit board connector with the conductive pattern exposed.

Referring now more specifically to the drawings, there is shown generally at 1 a foolproof battery connector in accordance with my invention which consists primarily of a printed circuit board or panel. The printed circuit board or panel consists of a flat laminated structure including a rectangularly-shaped insulating base or body 2 to which is bonded thin metallic or electrically conductive sections 3, 4 and 5 forming a printed circuit pattern. The conductive pattern or network of the printed circuit board may be formed by using any of the etching methods well known in the art, such as, by the photo engraving or the manual resist process. The conductive section 3 consists of a narrow ribbon-like portion 7 forming a conductive path between an enlarged circular battery engaging portion 8 and terminal area 9. The conductive section 4 consists of a plurality of enlarged or circularly-shaped battery engaging portions 11, 12, 13, 14 and 15 which are serially interconnected by narrow ribbon-like portions 16, 17, 18 and 19, respectively. Similarly, conductive section 5 consists of a plurality of enlarged circular battery engaging portions 21, 22, 23 and 24 which are serially interconnected by narrow ribbon-like portions 25, 26 and 27, respectively. A narrow ribbon-like portion or path 28 connects the conductive section 5 to a terminal area 29. The terminal areas 9 and 29 are provided with suitably drilled apertures or holes 10 and 20 (FIG. 2), into which output leads 30 and 31, respectively, are inserted and then soldered, all in the well known manner.

The printed circuit board or panel may be securely held in fixed relation with the bottom surface of an upper transistorized transmitter-receiver assembly (not shown) by machine screws inserted through apertures 32 threaded into suitable bushings (not shown). As previously mentioned, it is essential that the conductors 30 and 31 which are electrically connected to the transmitter-receiver units are always provided with the particular voltage polarity shown in FIG. 1.

A pair of conventional six (6) volt lantern batteries 33 and 34 are shown disposed within a lower plastic carrying case 35 which cooperates with a suitable detachable cover member (not shown) carried by the transmitter-receiver assembly. As shown in FIG. 1, the negative spring terminals 36 and 37 of batteries 33 and 34 always communicate with the centrally located circular engaging portions 11 and 8, respectively, regardless of how each lantern battery oriented within case 35 since terminals 36 and 37 have a central location on the square tops of the lantern batteries. The positive spring terminal 38 of battery 33 is shown in cooperative alignment with circular engaging portion 21, but it is apparent that this positive terminal is multipositionable and may assume any of three additional corner positions simply by rotating battery 33 through three 90 degree placements. One of the circular terminal engaging portions 23, 24 and 25 will electrically contact positive spring terminal 38 whenever lantern battery 33 is in any other corner position from that shown in FIG. 1. Similarly, positve spring terminal 39 of lantern battern 34 is shown in cooperative alignment with the circular engaging portion 13. However, it is noted that battery 34 is also multipositionable so that spring terminal 39 will engage either circular engaging portion 12, 14 or 15 whenever lantern battery 34 is disposed in a corner position other than that hown in FIG. 1.

As is readily apparent the unique printed circuit board connector provides that the lantern batteries 33 and 34 are always in series aiding relationship, and insures that output lead 31 is positive while output lead 30 is negative regardless of the manner in which batteries 33 and 34 are placed in case 35. Accordingly, no special care need be exercised or specific instructions followed in placement of the batteries for insuring proper polarity of conductors 30 and 31 since the voltage polarity will always be the same when the printed circuit connector engages batteries 33 and 34.

Further, due to its symmetrical configuration the printed circuit board may be displaced 180 degrees relative to housing 35 as shown in FIG. 1 without changing the voltage polarity on conductors 30 and 31.

Accordingly, the printed circuit board connector results in a simple, inexpensive yet durable foolproof method which insures a series aiding connection of a pair of lantern batteries resulting in one given voltage polarity on a pair of output conductors regardless of physical battery disposition or relative disposition of upper and lower housing members in regard to each other.

Although I have shown and described but one form of a printed circuit board connector in application with lantern batteries of a transmitter-receiver communication unit, it is understood that this invention may be used in other surroundings requiring a given voltage polarity and that changes and modifications may be made therein within the scope of the appended claims and without departing from the spirit and scope of my invention.

Having thus described my invention, what I claim is:

1. A battery connector for properly interconnecting at least two lantern batteries and providing a polarized voltage on a pair of output conductors, comprising, a flat insulating base having three metallic sections forming a conductive pattern disposed on one surface of said flat insulating base, said conductive pattern including at least eight first battery terminal engaging portions, at least two second battery terminal engaging portions, and at least nine electrically interconnecting portions, one of said three metallic sections being open-sided and having at least four of said first battery terminal engaging portions interconnected by at least three of said electrically interconnecting portions and having another of said electrically interconnecting portions connecting said one metallic section to one of said pair of output conductors, a second of said three metallic sections being open-sided and having at least another four of said first battery terminal engaging portions and at least another three of said electrically four of said first battery terminal engaging portions, at least another electrically interconnecting portion connecting at least one of said second battery terminal engaging portions to said second metallic section and the third of said three metallic sections having at least another of said at least two second battery terminal engaging portions electrically connected by at least another of said electrically interconnecting portions to the other of said pair of output conductors, said one and said another of said at least two second battery terminal engaging portions being centrally disposed in said four of said at least eight first battery terminal engaging portions of said one and said second metallic sections respectively.

2. A battery connector as defined in claim 1, wherein said first and second battery terminal engaging portions are circular in shape and said electrically interconnecting portions are ribbon-like.

References Cited

UNITED STATES PATENTS

| 1,201,939 | 10/1916 | Cole | 136—108 |
| 2,744,188 | 5/1956 | Olsen et al. | 339—152 X |
| 2,971,179 | 2/1961 | Heuer | 339—17 |

MARVIN A. CHAMPION, *Primary Examiner.*

ALFRED S. TRASK, PATRICK A. CLIFFORD,
*Examiners.*

UNITED STATES PATENT OFFICE
CERTIFICATE OF CORRECTION

Patent No. 3,339,169                          August 29, 1967

Andrew F. Freeland

It is hereby certified that error appears in the above numbered patent requiring correction and that the said Letters Patent should read as corrected below.

Column 4, line 13, after "electrically" insert -- interconnecting portions connecting said at least another --.

Signed and sealed this 30th day of July 1968.

(SEAL)
Attest:

Edward M. Fletcher, Jr.                      EDWARD J. BRENNER
Attesting Officer                           Commissioner of Patents